3,071,116
PNEUMATIC HAMMER

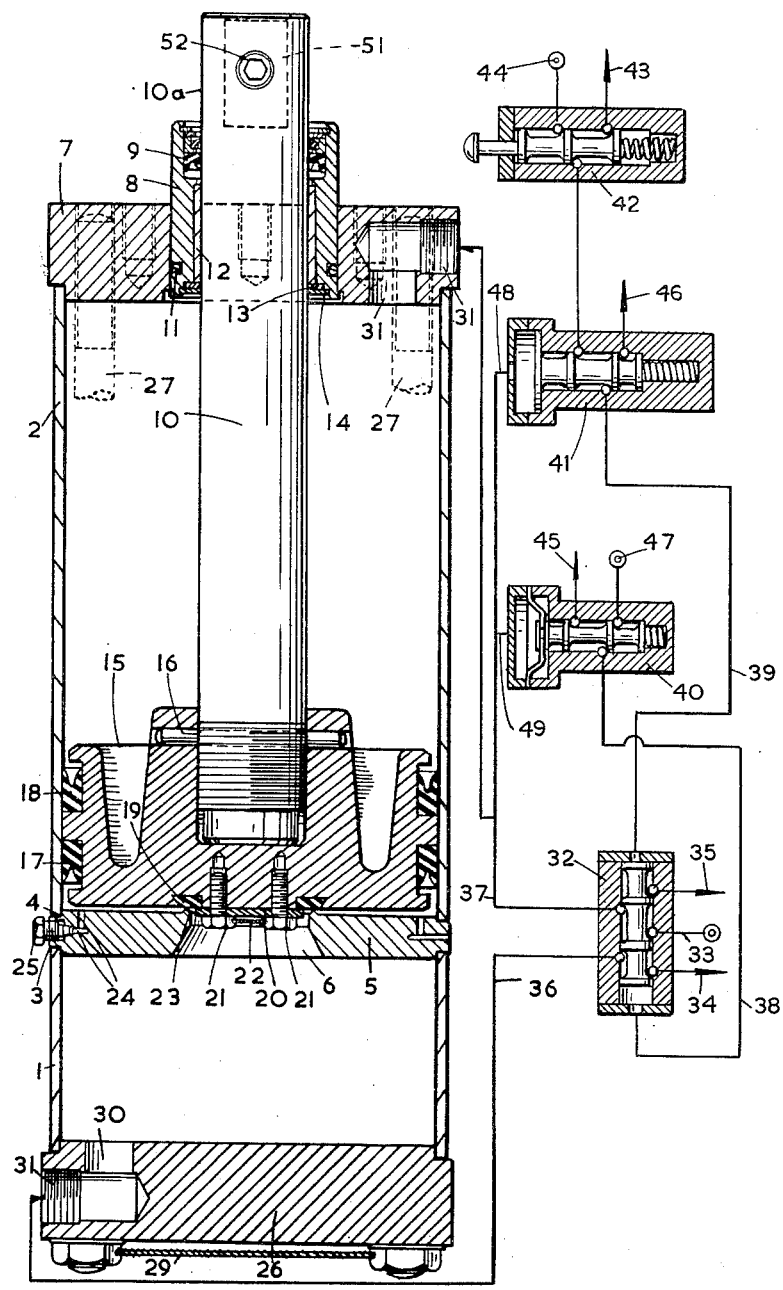

Cosby Donald Philipps Smallpeice, Swanwick Shore, near Southampton, England, assignor to Martonair Limited, Richmond, Surrey, England
Filed Dec. 14, 1959, Ser. No. 859,233
6 Claims. (Cl. 121—38)

The invention relates to a pneumatic motor for a pneumatic hammer, and has for its object to enable a hammer blow to be delivered with appropriate suddenness.

According to the invention a pneumatic motor includes a piston working in a cylinder and mounted at the head of a coacting piston rod which extends sealingly through one end of the cylinder for connection to the means for delivering the hammer blow, the opposite end of the cylinder communicating through a port, which will be closed by the head of the piston when the latter is at the end of its inward stroke, with an air reservoir, and valve means adapted when operated to one position to connect the cylinder at the said one end to a supply of compressed air and to connect the reservoir to exhaust, whereby to move the piston to close the port, and when operated to another position to reverse those connections whereby when the force, due to the rising pressure in the reservoir, acting on the area of the piston head exposed by the port exceeds the force, due to the diminishing pressure in the exhausting cylinder acting on the opposite end of the piston, the piston will move to unseal the port and admit pressurised air from the reservoir and the supply to act on the whole area of the piston head for making its outward stroke suddenly.

Preferably, the area of the port (and thus of the portion of the piston head which is exposed when the piston is closing the port) is less than the area of the opposite end of the piston minus the area of the piston rod.

According to a further feature, the pressure achieved in the cylinder when the piston engages the port to close the latter, or the pressure drop at the opposite side of the piston is applied against a return motion bias, to operate the valve to the said another position whereby the motor piston will reciprocate automatically. Such a return motion bias can be provided by baises acting on the movable members of a pair of additional valves which are connected to reverse the operation of the said valve.

One embodiment of the invention is illustrated by the single FIGURE of the accompanying drawing which shows the driving arrangements for a pneumatic motor in longitudinal section, and indicates diagrammatically one arrangement of valves for providing automatic action.

Referring to the drawing, the reservoir 1 is cylindrical and of the same diameter as the cylinder 2, being aligned therewith. The adjacent ends of the reservoir and cylinder have respective spigotal engagements 3, 4 with a transverse bulkhead 5 having a central port 6. The opposite end of the cylinder has a spigotally-fitting, annular closure member 7 which supports in its inner periphery a guide 8 provided with a seal 9 for the extending end 10a of the piston rod 10.

A sealing ring 11 is arranged in an annular channel between the outer periphery of the guide 8 and a bore in the closure member 7 in which it is accommodated, and the bore of the guide is provided with an anti-friction sleeve 12, held in position by a ring 13 and circlip 14, for the piston rod. The piston 15 is held on the inner end of the piston rod by a through pin 16 and it is provided with two opposed sealing rings 17, 18 in its periphery whereby to establish an efficient seal with the cylinder wall 2 during both directions of piston movement.

The piston head is provided with a coaxial groove in which is accommodated a resiliently compressible ring 19, for coacting with the port 6, held in position by a co-axial disc 20, of smaller diameter, which is secured to the piston head by screws 21, 21 such as to leave an outer annulus of the compressible ring for coaction with the port. The heads of the screws are accommodated within the port, when the latter is closed, and can be wired together as indicated at 22 to prevent accidental displacement.

The side of the bulkhead adjacent the piston is provided with an annular ridge 23 coaxially around the port so that, when the piston is at the end of its inward stroke, the ridge closely engages the resiliently compressible ring 19 to effect an efficient seal.

At least one L-shaped duct 24 leading from the cylinder to the outer periphery of the bulkhead is provided with a flow-restrictor 25 whereby to provide a controlled cushioning for the piston at the end of its inward travel and so as to protect ring 19 from undue pressure from the ridge.

The outer end of the reservoir has a closure member 26, and this closure member and closure member 7 are rectangular in outline so as to provide four corners which extend radially beyond the cylinder and reservoir. Corresponding ones of these corners are interconnected by tie rods 27 which have a screw-threaded engagement at one end in the member 7 and are provided with nuts 28, wired together at 29, at their other ends to hold the parts assembled.

The closure members 7 and 26 have respective communications, provided by intersecting bores 30 and 31, with a valve which can be operated to one position for admitting compressed air to beneath the piston and for simultaneously connecting the reservoir to exhaust, and to a second position in which the cylinder beneath the piston is connected to exhaust and the reservoir is connected to receive the compressed air.

This valve, which can be of any suitable construction provided the desired functioning is provided, is indicated diagrammatically at 32. Its body has a connection 33 to a supply of compressed air, and two exhaust connections which are respectively shown at 34 and 35, and it has connections through lines 36 and 37 with the communications 30, 31 respectively of the reservoir and cylinder. The movable member of the valve is adapted to be operated into either of two limiting positions so as to establish the necessary connections.

With the movable valve member in the position establishing the connections shown, the suplpy 33 is being delivered to the cylinder 2 so as to urge the piston from the outward end of its stroke to its inward end, in which latter position it is shown in the drawing. At the same time the air in the reservoir is being exhausted through 36 and 34.

When the piston seals port 6 at 19, 23, the position of the movable valve member is reversed (and this can be done manually, or by the automatically-acting means hereinafter described) so as to supply compressed air to the reservoir through 33 and 36 and to exhaust the cylinder through 37 and 35.

It will be seen that when the piston is closing the port, the area of the piston head which is subject to the pressure in the reservoir is defined by the inner periphery of the ridge 23, and that as the pressure within the cylinder reduces owing to it being connected to exhaust, a condition will arise in which the force, due to the reservoir pressure acting on the portion of the piston head defined by the ridge, will exceed the pressure holding the piston for maintaining the port closed. At this point the piston will commence its outward stroke, and this admits pressure from the reservoir to act over the whole of the area of the piston head as soon as the seal with the ridge and the port is broken. In this way the piston will make its outward stroke suddenly.

As previously stated, it is arranged for the pressure rise within the cylinder, after the piston finishes its inward stroke, to be communicated to a means for operating valve 32 to connect the cylinder to exhaust and the reservoir to the supply of compressed air. Valve 40 is biassed with a pressure just greater than the minimum pressure (e.g., atmospheric) which will obtain in the cylinder at the end of the outward stroke of the piston, and thus the bias will automatically reverse the connections of valve 40 when the piston reaches the end of its outward stroke and cause the piston to return to its inward position automatically. Valve 41 is biassed with a pressure just less than the maximum pressure (e.g., that of supply line 33) which will obtain in the cylinder at the end of the inward stroke of the piston, and thus the bias will automatically reverse the connections of valve 41 when the piston reaches the end of its inward stroke such that, with valve 42 in the Start position (as will be later described), the piston will make its sudden outward stroke.

The valve 32 conveniently has its movable member adapted to be moved from each of its limiting positions to the other in response to a difference between the pressure in two lines. Thus, the movable member can be a plunger working in a cylindrical bore having chambers at its opposite ends connected by lines 38, 39 respectively to two automatic control valves 40 and 41 which are arranged to actuate the valve 32 in response to pressure conditions in the cylinder.

The pneumatic circuit is controlled by a Start/Stop valve 42 which will allow the motor to perform a series of cycles whilst it remains depressed but which will cause the motor to stop at the end of its inward stroke when it is released, as will be described later.

The valves 32, 40 and 41 are shown with their respective movable members in the positions they occupy after the piston has stopped at the end of its inward stroke. To start the motor operating, the push button of the Start/Stop valve 42 is depressed to apply pneumatic pressure from supply 44 through valve 41 to line 39, and as valve 40 is connecting line 38 to exhaust at 45 the movable member of valve 32 is moved to its opposite limiting position, thus reversing the connections to the cylinder and reservoir with the result that the pressure in the reservoir commences to rise and that in the cylinder to fall. When the pressure in the cylinder has fallen to a value less than the bias of valve 41 the movable member of the later will move to connect line 39 to exhaust 46. As both ends of valve 32 are connected to exhaust the movable valve member will stay in its said opposite limiting position. When the pressure in the reservoir preponderates over that in the cylinder, port 6 is suddenly opened and the piston starts its sudden outward stroke. After the outward stroke has been completed the pressure in the cylinder falls, and when it reaches a value lower than the bias of valve 40 the movable member of the latter is operated to connect line 38 to supply 47. As line 39 is already connected to exhaust 46 the movable member of valve 32 will be biassed to the position shown whereby to supply the cylinder and exhaust the reservoir for a new inward stroke of the piston to commence.

After the pressure of the supply through 33 and 37 to the cylinder has built up to a value greater than the bias of valve 40, the movable member of the latter will be moved against the bias to the position shown whereby to connect line 38 to exhaust 45. As line 39 is still connected to exhaust 46 the movable member will stay in the position shown.

The supply through 33 and 37 moves the piston to the limit of its inward travel, after which the pressure in the cylinder increases towards the value of the pressure from supply 33 until the pressure in the cylinder is at sufficient magnitude to move the movable member of valve 41 against its bias to the position shown whereby to connect line 39 to supply 43 (providing the Start/Stop valve 42 remains depressed). As line 38 is connected to exhaust the movable member of valve 32 is again moved to its said opposite limiting position and the motor will continue to cycle until the Start/Stop valve 42 is released. After the valve 42 has been kept depressed sufficiently long for the sudden outward stroke of the piston to be initiated the piston will complete its outward stroke and return to its inward position even if the Start/Stop valve 42 is then released.

Obviously, instead of employing pneumatically-operating valves like 40 and 41 use could be made of electro-magnetically-operating valves which would be energised through suitably arranged contacts.

The outer end 10a of the piston rod is shown formed with a socket 51 to receive the stem of a hammer, and with a set-screw 52 for locking it in position.

What I claim as my invention and desire to secure by Letters Patent of the United States is:

1. A pneumatic motor comprising a pneumatic cylinder and a pneumatic reservoir, said cylinder and reservoir intercommunicating through a port in one end of said cylinder, a piston operable in said cylinder and having a piston rod extending sealingly through an opposite end of said cylinder, said piston having a face at its head end with its plane normal to the piston axis, said port of less area than the area of the piston head face, the piston head face when said piston is at its inner limit of travel adapted to abut said port to close it, and valve means adapted when in one position to connect said cylinder in a position beneath said piston to a supply of compressed air and to connect said reservoir to exhaust whereby to move said piston for its head face to abut and close said port, and said valve means when in another position adapted to connect said reservoir to said supply and said cylinder to exhaust such that when the force due to the consequent rising of pressure in said reservoir acting on the area of said piston head face exposed by said port exceeds the force due to the diminishing pressure in the exhausting cylinder acting beneath said piston, said piston will move to unseal said port suddenly and admit pressurised air from said reservoir and said supply to act on the whole area of the piston head face to provide maximum acceleration for said piston, and automatic means operated by the prevailing pressure in the cylinder and interconnected to said valve means for moving said valve means to and from its two positions.

2. A pneumatic motor comprising a pneumatic cylinder and a pneumatic reservoir, said cylinder and reservoir intercommunicating through a port in one end of said cylinder, a piston operable in said cylinder and having a piston rod extending sealingly through an opposite end of said cylinder, said piston having a face at its head end with its plane normal to the piston axis, said port of less area than the area of the underside of said piston minus the cross-sectional area of said piston rod, the piston head face when said piston is at its inner limit of travel adapted to abut said port to close it, and valve means adapted when in one position to connect said cylinder in a position beneath said piston to a supply of compressed air and to connect said reservoir to exhaust whereby to move said piston for its head face to abut and close said port, and said valve means when in another position adapted to connect said reservoir to said supply and said cylinder to exhaust such that when the force due to the consequent rising of pressure in said reservoir acting on the area of said piston head face exposed by said port exceeds the force due to the diminishing pressure in the exhausting cylinder acting beneath said piston, said piston will move to unseal said port suddenly and admit pressurised air from said reservoir and said supply to act on the whole area of the piston head face to provide maximum acceleration for said piston, and pneumatically operated means subject to pressure changes in said cylinder and connected to said valve means to actuate said valve means between its two position.

3. A pneumatic motor comprising a pneumatic cylinder and a pneumatic reservoir, said cylinder and reservoir intercommunicating through a port in one end of said cylinder, a piston operable in said cylinder and having a piston rod extending sealingly through an opposite end of said cylinder, said piston having a face at its head end with its plane normal to the piston axis, said port of less area than the area of the piston head, said port having a peripheral ridge directed axially towards said piston, the piston head having a resiliently-compressible seating, said seating when said piston is at its inner limit of travel adapted sealingly to abut said ridge to close said port, and valve means adapted when in one position to connect said cylinder in a position beneath said piston to a supply of compressed air and to connect said reservoir to exhaust whereby to move said piston for its head to abut and close said port, and said valve means when in another position adapted to connect said reservoir to said supply and said cylinder to exhaust such that when the force due to the consequent rising of pressure in said reservoir acting on the area of said piston exposed by said port exceeds the force due to the diminishing pressure in the exhausting cylinder acting beneath said piston, said piston will move to unseal said port suddenly and admit pressurised air from said reservoir and said supply to act on the whole area of the piston head face to provide maximum acceleration for said piston, and pneumatically operated means comprising two control valves actuated by the prevailing pressure in said cylinder and connected to said valve means to move the valve means between its two positions.

4. A pneumatic motor comprising a pneumatic cylinder and a pneumatic reservoir, said cylinder and reservoir intercommunicating through a port in one end of said cylinder, a piston operable in said cylinder and having a piston rod extending sealingly through an opposite end of said cylinder, said piston having a face at its head end with its plane normal to the piston axis, said port of less area than the area of the piston head face, the piston head face when said piston is at its inner limit of travel adapted to abut said port to close it, and a pneumatically-operated valve means, said valve means adapted when in one position to connect said cylinder in a position beneath said piston to a supply of compressed air and to connect said reservoir to exhaust whereby to move said piston for its head face to abut and close said port, and said valve means when in another position adapted to connect said reservoir to said supply and said cylinder to exhaust such that when the force due to the consequent rising of pressure in said reservoir acting on the area of said piston head face exposed by said port exceeds the force due to the diminishing pressure in the exhausting cylinder acting beneath said piston, said piston will move to unseal said port suddenly and admit pressurised air from said reservoir and said supply to act on the whole area of the piston head face to provide maximum acceleration for said piston, and pneumatic means for moving said valve means from one of its positions to the other of its positions comprising two control valves operated in opposite senses by the pressure in the cylinder and connected to said valve means.

5. A pneumatic motor comprising a pneumatic cylinder and a pneumatic reservoir, said cylinder and reservoir intercommunicating through a port in one end of said cylinder, a piston operable in said cylinder and having a piston rod extending sealingly through an opposite end of said cylinder, said piston having a face at its head end with its plane normal to the piston axis, said port of less area than the area of the piston head face, the piston head face when said piston is at its inner limit of travel adapted to abut said port to close it, and a valve means, said valve means adapted to be operated pneumatically from each of two limiting positions to the other, respective control valves adapted to operate said valve means pneumatically to each of its limiting positions, said valve means adapted when operated to one of its limiting positions to connect said cylinder in a position beneath said piston to a supply of compressed air and to connect said reservoir to exhaust whereby to move said piston for its head face to abut and close said port, and said valve means when operated to the other of its limiting postions adapted to connect said reservoir to said supply and said cylinder to exhaust such that when the force due to the consequent rising of pressure in said reservoir acting on the area of said piston head face exposed by said port exceeds the force due to the diminishing pressure in the exhausting cylinder acting beneath said piston, said piston will move to unseal said port suddenly and admit pressurised air from said reservoir and said supply to act on the whole area of the piston head face to provide maximum acceleration for said piston, said control valves being operated by the pressure in said cylinder and when so operated move the valve means to one or the other of its limiting positions.

6. A pneumatic motor comprising a pneumatic cylinder and a pneumatic reservoir, said cylinder and reservoir intercommunicating through a port in one end of said cylinder, a piston operable in said cylinder and having a piston rod extending sealingly through an opposite end of said cylinder, said piston having a face at its head end with its plane normal to the piston axis, said port of less area than the area of the piston head face, the piston head face when said piston is at its inner limit of travel adapted to abut said port to close it, and a valve means, said valve means adapted to be operated pneumatically from each of two limiting positions to the other, respective control valves adapted to operate said valve means pneumatically to each of its limiting positions, a starting and stopping valve, said valve means adapted when operated to one of its limiting postions to connect said cylinder in a position beneath said piston to a supply of compressed air and to connect said reservoir to exhaust whereby to move said piston for its head face to abut and close said port, and said valve means when operated to the other of its limiting positions adapted to connect said reservoir to said supply and said cylinder to exhaust such that when the force due to the consequent rising of pressure in said reservoir acting on the area of said piston head face exposed by said port exceeds the force due to the diminishing pressure in the exhausting cylinder acting beneath said piston, said piston will move to unseal said port suddenly and admit pressurised air from said reservoir and said supply to act on the whole area of the piston head face to provide maximum acceleration for said piston, and said starting and stopping valve interconnected with said control valves, said control valves adapted for automatically operating said valve means between its limiting positions for causing a series of piston strokes to be effected automatically, said control valves being connected to said cylinder and operated by the pressure therein.

References Cited in the file of this patent

UNITED STATES PATENTS

| | | |
|---|---|---|
| 1,799,366 | Heinkel | Apr. 7, 1931 |
| 2,328,438 | Ernst | Aug. 31, 1943 |
| 2,396,052 | Light | Mar. 5, 1946 |
| 2,502,800 | Renick | Apr. 4, 1950 |
| 2,689,548 | Holm et al. | Sept. 21, 1954 |
| 2,698,517 | Witt | Jan. 4, 1955 |
| 2,745,386 | Wildeman | May 15, 1956 |
| 2,777,425 | Adams et al. | Jan. 15, 1957 |
| 2,854,953 | Osborne | Oct. 7, 1958 |
| 2,925,803 | Ottestad | Feb. 23, 1960 |
| 2,949,096 | Ottestad et al. | Aug. 16, 1960 |
| 2,979,938 | Ottestad | Apr. 18, 1961 |